United States Patent [19]

Foster et al.

[11] Patent Number: 5,230,758
[45] Date of Patent: Jul. 27, 1993

[54] METHOD OF PROCESSING ZIRLO MATERIAL FOR LIGHT WATER REACTOR APPLICATIONS

[75] Inventors: John P. Foster, Monroeville; Robert J. Comstock, Penn Township, Westmoreland County, both of Pa.; Samuel A. Worcester, Ogden, Utah; George P. Sabol, Export, Pa.

[73] Assignee: Westinghouse Electric Corp., Pittsburgh, Pa.

[21] Appl. No.: 854,044

[22] Filed: Mar. 18, 1992

Related U.S. Application Data

[62] Division of Ser. No. 399,662, Aug. 28, 1989, Pat. No. 5,112,573.

[51] Int. Cl.$^5$ .............................................. C22C 16/00
[52] U.S. Cl. .................................... 148/672; 420/422
[58] Field of Search ....................... 148/672; 420/422

[56] References Cited

U.S. PATENT DOCUMENTS

| | | | |
|---|---|---|---|
| 2,772,964 | 12/1956 | Thomas et al. | 148/672 |
| 3,121,034 | 2/1964 | Anderko et al. | 148/672 |
| 3,148,055 | 9/1964 | Kass et al. | 420/422 |
| 3,567,522 | 3/1971 | Thomas et al. | 148/672 |
| 3,575,806 | 4/1971 | Boulton | 176/50 |
| 3,865,635 | 2/1975 | Hofvenstam et al. | 148/672 |
| 3,963,534 | 6/1976 | Frenkel et al. | 148/672 |
| 4,065,328 | 12/1977 | Cheadle | 148/672 |
| 4,108,687 | 8/1978 | Armand et al. | 148/672 |
| 4,212,686 | 7/1980 | Lunde et al. | 148/672 |
| 4,238,251 | 12/1980 | Williams | 148/672 |
| 4,450,020 | 5/1984 | Vesterlund | 148/672 |
| 4,584,030 | 4/1986 | McDonald et al. | 148/672 |
| 4,649,023 | 3/1987 | Sabol et al. | 420/422 |
| 4,718,949 | 1/1988 | Takase et al. | 148/672 |
| 4,775,508 | 10/1988 | Sabol et al. | 420/422 |
| 4,814,136 | 3/1989 | Sabol et al. | 420/422 |
| 4,879,093 | 11/1989 | Garde | 420/422 |
| 4,981,527 | 1/1991 | Charquet | 420/422 |

OTHER PUBLICATIONS

Castaldelli et al. "Long-Term Test Results of Promising New Zirconium Alloys", *Zirconium in the Nuclear Industry*, 5th Conference, ASTM STP 754, 1982, pp. 105–126.

*Primary Examiner*—Upendra Roy
*Attorney, Agent, or Firm*—J. C. Valentine

[57] ABSTRACT

This is an alloy comprising, by weight percent, 0.5–2.0 niobium, 0.7–1.5 tin, 0.07–0.14 iron, and 0.03–0.14 of at least one of nickel and chromium, and at least 0.12 total of iron, nickel and chromium, and up to 220 ppm C, and the balance essentially zirconium. Preferably, the alloy contains 0.03–0.08 chromium, and 0.03–0.08 nickel. The alloy is also preferably subjected intermediate recrystallization anneals at a temperature of about 1200°–1300° F., and to a beta quench two steps prior to final size.

17 Claims, 1 Drawing Sheet

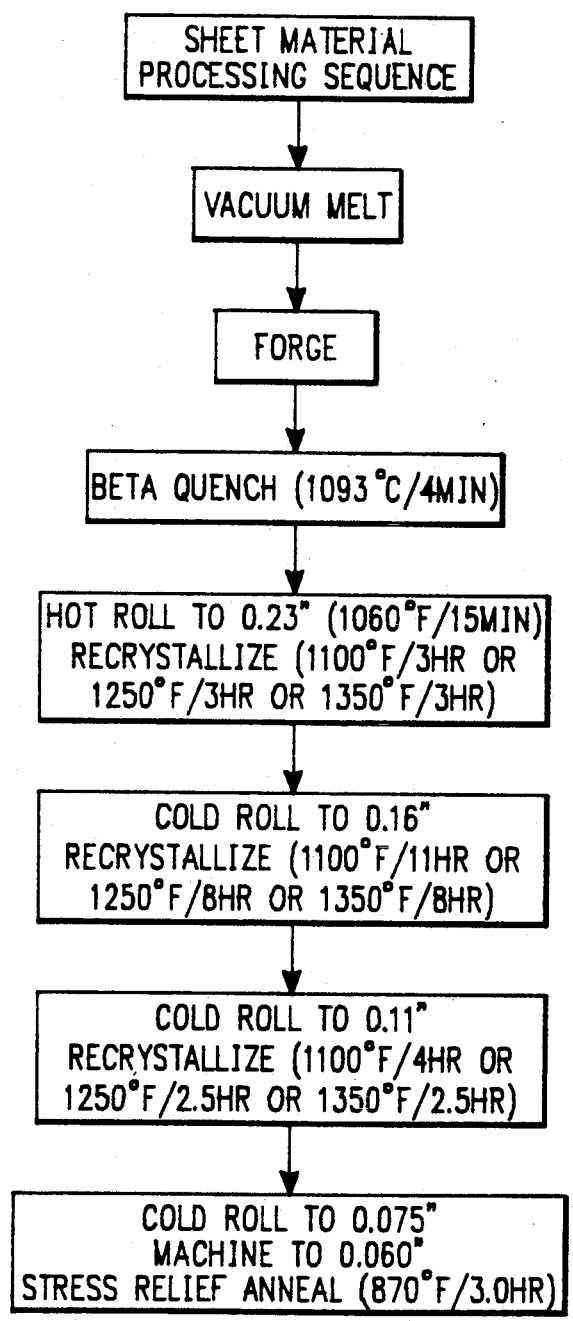

METHOD OF PROCESSING ZIRLO MATERIAL FOR LIGHT WATER REACTOR APPLICATIONS

This is a division of application Ser. No. 07/399,662 filed Aug. 28, 1989 U.S. Pat. No. 5,112,573.

CROSS REFERENCE TO RELATED APPLICATIONS

This application is related to a co-pending application Ser. No. 07/711,561, now U.S. Pat. No. 5,125,985 entitled "ZIRLO Material Composition and Fabrication Processing" filed concurrently herewith and assigned to the same assignee. That copending application provides a method of controlling creep in zirconium-niobium-tin-iron alloys by means of process variations.

BACKGROUND OF THE INVENTION

The invention relates to a zirconium based material and more particularly to composition ranges for improved corrosion resistance.

In the development of nuclear reactors, such as pressurized water reactors and boiling water reactors, fuel designs impose significantly increased demands on all of the core components, such as cladding, grids, guide tubes, and the like. Such components are conventionally fabricated from the zirconium-based alloys, Zircaloy-2 and Zircaloy-4. Increased demands on such components will be in the form of longer required residence times and thinner structural members, both of which cause potential corrosion and/or hydriding problems. These increased demands have prompted the development of alloys that have improved corrosion and hydriding resistance, as well as fabricability and mechanical properties that are typical of the conventional Zircaloys. One such class of materials are the zirconium alloys containing zirconium, niobium, tin, and a third alloying element, for example, a zirconium alloy containing 1 percent by weight niobium, 1 percent by weight tin, and usually at least 0.15 percent by weight iron. Alloys of zirconium, niobium, tin and iron which have been proposed include those of Castaldelli et al. ("Long-term Test Results of Promising New Zirconium Alloys," *Zirconium in the Nuclear Industry*, 5th Conference, ASTM STP 754, 1982, pages 105-126) who tested a zirconium 1Nb-1Sn-0.5 Fe alloy and mention a zirconium 1Nb-1Sn alloy with 0.15-0.20 Fe.

Another alloy, which is known as Ozhennite 0.5, comprises 0.18-0.22 wt. % Sn, 0.09-0.11 wt. % Nb, 0.09-0.11 wt. % Fe, and 0.09-0.11 wt. % Ni, all alloyed with Zr. U.S. Pat. No. 4,649,023, issued Mar. 10, 1987 (hereinafter "the ZIRLO patent") is a composition and process patent, generally covering a composition range of 0.5-2.0 w/o (weight percent) Nb, 0.9-1.5 w/o Sn, 0.09-0.11 w/o of a third element selected from Fe, Cr, Mo, V, Cu, Ni or W, and generally with annealing temperatures between cold working stages in the range of 932°-1202° F.

SUMMARY OF THE INVENTION

This is a ZIRLO-type material with a composition having more total iron, chromium, and nickel than ZIRLO.

The alloy comprises, by weight percent, 0.5-2.0 niobium, 0.7-1.5 tin, 0.07-0.14 iron, and 0.03-0.14 of at least one of nickel and chromium, and at least 0.12 total of iron, nickel and chromium, and up to 220 ppm C, and the balance essentially zirconium. Preferably, the alloy contains 0.03-0.08 chromium, and 0.03-0.08 nickel. The alloy is also preferably subjected intermediate recrystallization anneals at a temperature of about 1200°-1300° F., and to a beta quench two steps prior to final size.

The material exhibits similar corrosion resistance to the ZIRLO composition claimed in the ZIRLO patent, but is more economically produced than ŻIRLO as it allows Zircaloy recycle and provides a more easily controlled composition, while maintaining the similar corrosion resistance.

BRIEF DESCRIPTION OF THE DRAWINGS

The invention as set forth in the claims will become more apparent by reading the following detailed description in conjunction with the accompanying drawing, in which:

The sole FIGURE schematically outlines the processing sequence.

DETAILED DESCRIPTION OF THE EMBODIMENT

The ZIRLO-type material has a composition of 0.5-2.0 niobium, 0.7-1.5 tin, 0.07-0.14 iron, and 0.03-0.14 of at least one of nickel and chromium, and at least 0.12 total of iron, nickel and chromium, and up to 220 ppm C, and the balance essentially zirconium. In one embodiment it contains 0.08-0.12 w/o Fe, 300-800 ppm Cr, 300-800 ppm Ni, and 50-220 ppm C (Cr+Ni in the range of 600 to 1200 ppm). The material exhibits similar corrosion resistance relative to ZIRLO material with the composition claimed in the ZIRLO patent. The composition provides for recycling of significant proportions of zircaloy material. The processing sequence used during the experiments for strip material is schematically outlined in the FIGURE. The strip material processing method is similar to the tube processing described in the ZIRLO patent. Table 1 presents the long term corrosion results for tubing, including tubing which received a beta-quenched two sizes prior to final size. The beta-quench resulted in a slight reduction in the post-transition corrosion rate.

TABLE 1

Corrosion Improvement Due to Beta-Quenching the Tubeshells During Tube Reduction Two Steps Prior to Final Size.

| Beta-Quench | Intermediate Anneal Temperature (°F.) | 750° Post-Transition Corrosion Rate (mg/dm$^2$-day) |
| --- | --- | --- |
| No | 1100 | 1.03 |
| Yes | 1100 | 0.92 |
| No | 1170 | 1.01 |
| Yes | 1170 | 0.90 |

The TREX may be reduced to final size tubing by 3, 4 or 5 reductions. Several tubeshell reduction sequences which have been successfully used are listed in Table 2. The extrusion preferably receives a post-extrusion anneal at about 1100° F. (in the alpha phase region). The intermediate anneal temperature of the specimen generally was 1100° F., however, as noted below, intermediate recrystallization anneals at a temperature of about 1200°-1300° F. are preferred for corrosion resistance especially for boiling water reactors. The alloy is also preferably subjected to a late stage beta-quench, again to improve corrosion resistance.

TABLE 2

TUBESHELL REDUCTION SIZES
TREX Size: 2.5 inch IOD × 0.43 inch wall
Final Tube Sizes: 0.423 inch OD × 0.025 inch wall
0.375 inch OD × 0.023 inch wall
0.361 inch OD × 0.023 inch wall

| Method | Tubeshell Size Sequences (OD × wall-inch) | | | |
|---|---|---|---|---|
|  | First | Second | Third | Fourth |
| A | 1.12 × 0.25 | 0.65 × 0.075 | — | — |
| B1 | 1.75 × 0.30 | 1.25 × 0.20 | 0.70 × 0.070 | — |
| B2 | 1.75 × 0.30 | 1.00 × 0.18 | 0.61 × 0.070 | — |
| B3 | 1.75 × 0.30 | 1.25 × 0.20 | 0.88 × 0.11 | 0.54 × 0.050 |
| C | 1.56 × 0.29 | 1.125 × 0.16 | 0.625 × 0.70 | — |

While, as noted, some improvement in corrosion resistance may be obtained by performing a beta-quench on the tubeshell during the late stage of the reduction process, it should be also be noted that the thermal creep secondary rate is moderately increased by beta-quenching. As noted in the aforementioned co-filed application, a decrease in the area reduction and/or an increase in the intermediate anneal temperature could be used with late stage beta-quenched ZIRLO, to lower secondary thermal creep down to, for example, $1.68 \times 10^{-5}/h$.

EXAMPLE I

A series of ZIRLO ingots, prepared using sponge zirconium, were melted with C, Cr and Ni additions to determine the effect of such elements on ZIRLO corrosion. The ingot compositions are listed in Table 3. The specimen labeled ZL generally represents ZIRLO, the specimen labeled ZLC generally represents ZIRLO plus carbon, the specimen labeled ZL4 generally represents material of the invention, as might be produced by including about 50% recycled Zircaloy-4, and the specimen labeled ZL2 generally represents material of the invention, as might be produced by including about 50% recycled Zircaloy-2. The ingots were processed to 0.060 inch thick strip using a fabrication method that simulates tube production. The tests included 750° F. (about 400° C.) steam corrosion, 680° F., 70 ppm lithiated water (these tests are thought to be especially applicable to pressurized water reactor usage and results are given in Table 4) and 520° C. steam corrosion (which test is thought to be especially applicable to boiling water reactor usage and results are given in Table 5). The corrosion test weight gain results presented in Tables 4 and 5 are in $mg/dm^2$. ZIRLO strip material was also processed with intermediate anneal temperatures of 1100°, 1250° and 1350° F. Tables 4 and 5 also includes corrosion results for specimen ZL-A and ZL-B, which are of the same composition as ZL, but received an intermediate anneal temperature (IAT) of 1250° F. and 1350° F. respectively, instead of the 1100° F. IAT of specimen ZL. The 400° C. and 520° C. steam corrosion (as indicated by weight gain) was reduced, especially by the 1250° F. IAT. Thus the alloy is preferably subjected intermediate recrystallization anneals at a temperature of about 1200°–1300° F., (as well as to a beta quench two steps prior to final size).

TABLE 3

Ingot Chemistry of ZIRLO Strip Processed to Simulate Zircaloy Recycle.

| | Nb (w/o) | Sn (w/o) | Fe (w/o) | Cr (ppm) | Ni (ppm) | C (ppm) |
|---|---|---|---|---|---|---|
| ZL | 1.044 | 1.01 | 0.109 | 118 | <40 | 117 |
| ZLC | 1.023 | 0.96 | 0.104 | 290 | <35 | 182 |
| ZL4 | 1.040 | 0.98 | 0.106 | 645 | <35 | 201 |
| ZL2 | 1.034 | 0.98 | 0.105 | 620 | 299 | 190 |

TABLE 4

| Specimen | C | Cr | Ni | Weight Gain at 400° C. | | | 28 day Weight Gain 680° F., 70 ppm Li |
|---|---|---|---|---|---|---|---|
| | | | | 11 Days | 28 Days | 56 Days | |
| ZL | 117 | 118 | <40 | 26.6 | 46.8 | 92.0 | 30.5 |
| ZLC | 182 | 290 | <35 | 26.4 | 49.8 | 92.0 | 30.1 |
| ZL4 | 201 | 645 | <35 | 26.9 | 51.2 | 100.6 | 30.4 |
| ZL2 | 190 | 620 | 299 | 28.0 | 47.6 | 93.9 | 29.8 |
| | IAT | | | | | | |
| ZL | 1100 | | | 26.6 | 46.8 | 92.0 | 30.5 |
| ZL-A | 1250 | | | 28.5 | 41.8 | 85.6 | 34.1 |
| ZL-B | 1350 | | | 28.4 | 40.4 | 79.1 | 34.8 |

TABLE 5

| Specimen | C | Cr | Ni | Weight Gain at 520° C. | | | |
|---|---|---|---|---|---|---|---|
| | | | | 1 Day | 4 Days | 10 Days | 15 Days |
| ZL | 117 | 118 | <40 | 52.8 | 171.9 | 412.5 | 604.1 |
| ZLC | 182 | 290 | <35 | 60.1 | 172.0 | 408 | 596.1 |
| ZL4 | 201 | 645 | <35 | 54.6 | 186.5 | 458.7 | 662.5 |
| ZL2 | 190 | 620 | 299 | 58.0 | 180.5 | 437 | 633.6 |
| | IAT | | | | | | |
| ZL | 1100 | | | 52.8 | 171.9 | 412.5 | 604.1 |
| ZL-A | 1250 | | | | 51.7 | 164.0 | 388 | 575.5 |
| ZL-B | 1350 | | | | 50.3 | 169.6 | 397.6 | 588.2 |

It can be seen from the behavior of specimen ZLC in 400° C. and 520° C. steam and in 360° C. water with 70 ppm lithium that carbon does not increase the corrosion, and thus up to 220 ppm of carbon is allowed in the alloy of the invention. It should be noted that white nodular corrosion was not observed in any specimen despite the long test time at 520° C. This, together with the low weight gains, means that all alloys are very corrosion resistant in boiling water reactor conditions. The behavior of samples ZL and ZLC show that the addition of chromium from about 120 to 290 ppm does not increase 400° C. to 520° C. steam corrosion. The behavior of samples ZLC and ZL4 shows that the addition of chromium from about 290 to 645 ppm increases 400° C. and 520° C. steam corrosion. The behavior of samples ZL4 and ZL2 shows that the addition of nickel decreases 400° C. and 520° C. steam corrosion. Note that the additions of chromium and nickel did not increase the 360° C. water with 70 ppm lithium corrosion. The ZIRLO alloy of this invention, with the aforementioned process modifications, can probably be even better than the ZIRLO as processed in the aforementioned ZIRLO patent. Most importantly, however, the ZIRLO alloy of this invention has corrosion resistance essentially at least as good as ZIRLO while being more economically produced, as it allows Zircaloy recycle. It is also more economically produced, due to the fact that it has wider compositional ranges. The behavior of samples ZLC and ZL4 shows that the addition of chromium from about 290 to 645 ppm increases 400° C. and 520° C. steam corrosion. The behavior of samples ZL4 and ZL2 shows that the addition of nickel decreases 400° C. and 520° C. steam corrosion.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A method of processing zirconium wherein the zirconium is alloyed and subjected to a post extrusion anneal, a series of an intermediate area reductions and intermediate recrystallization anneals, a final area reduction to a final size and a final anneal; the improvement comprising:

alloying zirconium to produce an alloy containing by weight percent, 0.5-2.0 niobium, 0.7-1.5 tin, 0.07-0.14 iron, 0.025-0.08 chromium, nickel in sufficient amounts such that the value of the difference of (ppm chromium—ppm nickel) is less than 321 and 0.03-0.14 of at least one of nickel and chromium, and at least 0.12 total of iron, nickel and chromium, and up to 220 ppm carbon, and the balance essentially zirconium; and subjecting said alloy to intermediate recrystallization anneals at a temperature of about 1200°-1300° F.

2. The method of claim 1, wherein said alloy is subjected to a beta-quench two steps prior to a final size.

3. The method of claim 1, wherein the alloy is subjected to intermediate anneals of about 1250° F.

4. The method of claim 1, wherein the alloy is subjected to intermediate anneals of about 1350° F.

5. The method of claim 3, wherein the alloy is subjected to a beta quench two steps prior to a final size.

6. The method of claim 4, wherein the alloy is subjected to a beta quench two steps prior to a final size.

7. A method of processing zirconium wherein the zirconium is alloyed and subjected to a post extrusion anneal, a series of an intermediate area reductions and intermediate recrystallization anneals, a final area reduction to a final size and a final anneal; wherein the method is characterized by:

alloying zirconium to produce an alloy containing, by weight percent, 0.5-2.0 niobium, 0.7-1.5 tin, 0.07-0.14 iron, 0.01-0.08 chromium, nickel in sufficient amount such that the value of the difference of (ppm chromium—ppm nickel) is less than 255 and 0.01-0.14 of at least one of nickel and chromium, and at least 0.12 total of iron, nickel and chromium, and up to 0.022 carbon, and the balance essentially zirconium;

subjecting said alloy to intermediate recrystallization anneals at a temperature of about 1100°-1300° F.; and subjecting said alloy to a beta quench two steps prior to a final size.

8. The method of claim 7, wherein the alloy is subjected to intermediate anneals of about 1100° F.

9. The method of claim 7, wherein the alloy is subjected to intermediate anneals of about 1250° F.

10. The method of claim 7, wherein the alloy is subjected to intermediate anneals of about 1350° F.

11. A method of processing zirconium wherein the zirconium is alloyed and subjected to a post extrusion anneal, a series of an intermediate area reductions and intermediate recrystallization anneals, a final area reduction to a final size and a final anneal; wherein the method is characterized by:

alloying zirconium to produce an alloy containing, by weight percent, 0.5-2.0 niobium, 0.7-1.5 tin, 0.07-0.14 iron, 0.025-0.08 chromium, nickel in amounts such that the value of the difference of (ppm chromium—ppm nickel) is less than about 610, and at least 0.12 total or iron, nickel and chromium, and up to 0.022 carbon, and the balance essentially zirconium; and subjecting said alloy to intermediate recrystallization anneals at a temperature of about 1100°-1300° F.

12. The method of claim 11, wherein the alloy is subjected to intermediate anneals of about 1100° F.

13. The method of claim 11, wherein the alloy is subjected to intermediate anneals of about 1250° F.

14. The method of claim 11, wherein the alloy is subjected to intermediate anneals of about 1350° F.

15. The method of claim 12, wherein the alloy is subjected to a beta quench two steps prior to a final size.

16. The method of claim 13, wherein the alloy is subjected to a beta quench two steps prior to a final size.

17. The method of claim 14, wherein the alloy is subjected to a beta quench two steps prior to a final size.

* * * * *